Patented Mar. 23, 1937

UNITED STATES PATENT OFFIC 2,074,499

COLORING MATERIAL

Davidson C. Wysor, Ridgewood, N. J., assignor to General Chemical Company, New York, N. Y., a corporation of New York No Drawing. Original application June 13, 1931, Serial No. 544,292. Divided and this application June 21, 1933, Serial No. 676,921

9 Claims. (Cl. 134—58)

This application is a division of my co-pending application Serial No. 544,292, filed June 13, 1931, which copending application is a continuation in part of my application Serial No. 339,270, filed February 11, 1929.

This invention relates to a new coloring material or pigment, to the method of making the same, and to the use of the new material in the production of decorative coatings upon the wall surfaces of buildings and upon building material such as bricks and the like. The invention relates particularly to a novel form of "veneered" brick or the like employing my new coloring material and to the method of producing such veneered brick.

It has been proposed heretofore to produce decorative coatings upon wall surfaces having a stucco or plaster base and upon building materials such as bricks having a base of clay material by applying to the wall surface or brick various coloring materials or pigments to produce the desired color or shade. The production of so-called "veneered" bricks composed of ordinary common brick as a base having a coating of coloring material applied to one surface thereof is rapidly increasing in importance due to the much lower cost of these veneered bricks as compared to the usual face brick of substantially uniform composition throughout. In the production of such decorative coatings it is frequently desired to impart to the wall surface or to one surface of the brick a rich golden or bronze color which will be substantially unaffected by age and exposure to the weather and particularly for use upon the exterior surfaces of buildings where the ordinary gold or bronze paint rapidly deteriorates and loses its original color, without on the other hand necessitating the employment of expensive gold leaf. Up to the present time no satisfactory and relatively inexpensive coloring material or pigment which will produce a gold or bronze color of a permament nature has been available.

It is the object of my invention to provide a relatively inexpensive coloring material having a rich gold to bronze color or sheen and which is permanent under substantially all conditions of temperature and exposure to light and the weather. A further object of my invention is the provision of a simple and effective method of producing decorative coatings employing my new coloring material and specifically the production of a novel form of veneered brick employing my new coloring material and which is relatively inexpensive as compared to the ordinary face brick of substantially uniform ( throughout.

I have discovered that certain gr mineral substance mica which are ord saleable as first-class mica because of t ish, amber or even black cast acquire w or calcined in an oxidizing atmosph golden or bronze color or sheen wh manent and substantially unaffected exposure to the weather. The undesir ish, amber or black color in the r attributed to the presence of substanti of iron occurring as an impurity i mica, and which is present in the fe of oxidation. I have found that by calcining this impure mica at a suffic temperature (about 750° C. for 1½ the presence of air or other oxidizing the mica acquires a very pleasing bronze sheen apparently because the f is converted to the ferric state of oxi reason of the mineral nature of the substantially unaffected by age and w The calcined mica may be presse into the outer surface of stucco or p while the stucco or plaster is still plast that the mica particles will become i and adhere to the wall surface, whicl be permitted to harden in the usual if desired the mica particles may b ly incorporated with the stucco or p to its application to the wall.

An alternative and preferred metl ploying this coloring material is in t tion of veneered bricks as previous to. In this manner of practicing m the raw mica after having been redu desired particle size, is blown upon o slightly imbedded in one or more surf ordinary common brick composed of rial while the brick is still in a pl i. e., after having been shaped but pr ing been "burned" or calcined and ha this manner a thin coating or veneer mica is formed upon one surface of The bricks so formed are then calcine in the customary manner, which oper to oxidize the ferrous iron in the n ferric form and thus develop a rich go color in the mica. The brick so pro be employed in the production of w to provide a permanent rich golden of course at a much lower cost thar necessary to uniformly disseminate throughout the clay base of the bricl for example in the manufacture of
very thin facing tiles or blocks, it may
be to incorporate the mica uniformly
throughout the entire mass before shaping or
Such operations are of course within
of the invention.

various mineralogic forms is included
practice of my invention. The term "mica"
is to include the several members of
division as set forth on pages 611 to 663,
of Dana's "System of Mineralogy", published by
John Wiley & Sons, New York, 1893.
Forms of mica comprised under three
main groups of this division are as follows:

proper, including chiefly
  Muscovite
  Paragonite
  Lepidolite
  Zinnwaldite
  Biotite
  Phlogopite
  Lepidomelane
  Sericite nite or brittle micas, including chiefly
  Margarite
  Seybertite
  Xanthophyllite
  Chloritoid
  Ottrelite ite, including chiefly
  Clinochlore
  Peninite
  Prochlorite
  Corundophilite
  Daphnite
  Cronstedtite
  Thuringite
  Stilpnomelane
  Strigovite
  Diabantite
  Aphrosiderite
  Delessite
  Rumpfite members of these groups are character-
micaceous structure, that is, they have a
perfect basal cleavage and split easily into
fine or plates. Of the first group, biotite,
phlogopite and sericite are particu-
adapted to the purposes of the present
while chloritoid and clinochlore of the
third groups, respectively, are of such
that particularly satisfactory results may
obtained. Some micaceous substances
ed in the above grouping have the
of exfoliating to a high degree when
calcined in the above described man-
use of this excessive exfoliation, these
are so soft and easily crushed that
as continue to disintegrate to such an
are so physically unstable as to be
ucible to almost a powder, and hence
ed for many purposes for which the
the present invention are well adapt-
e other hand, the micas contemplated
accordance with the present inven-
such nature that when heated or cal-
ndividual particles of the product are
ely hard and retain their color and
size, and for this reason are well adapted for use
on outside surfaces subjected to weathering con-
ditions.

Not all of these micas contain iron as an essen-
tial constituent. However, the various forms of
mica commonly carry iron as an impurity or ac-
cessory constituent or component. My invention
therefore includes the use of all forms of mica in
which iron is present either as an essential or an
accessory component in sufficient quantity to
yield a bronze or golden color when calcined.

I have found as a general rule that the mica
should contain not less than about 1.0% iron
in order to develop a satisfactory golden to bronze
shade upon calcination, although particularly
pleasing coloring effects may be obtained where
the iron content of the micas range from about
four to about fifteen per cent.

In the appended claims, the term mica is in-
tended to exclude the vermiculites.

I claim:

1. As a new product, mica containing iron in
its composition, said iron being in the ferric
state of oxidation and sufficient in amount to
impart a gold to bronze color to the mica.

2. As a new product, mica containing iron in
its composition and which has been calcined at
a high temperature in an oxidizing atmosphere to
convert the iron to the ferric form, said mica
possessing a gold to bronze color.

3. The method of preparing coloring material
which comprises heating mica containing iron to
a temperature sufficiently high but not substan-
tially in excess of that required to develop a
golden to bronze color in the mica.

4. The method of preparing coloring material
which comprises heating mica containing iron at
temperatures of substantially 750° C. to develop
a golden to bronze color in the mica.

5. The method of preparing coloring material
having a golden to bronze color which comprises
calcining mica containing a substantial amount
of iron in its composition in an oxidizing atmos-
phere at a temperature sufficiently high but not
substantially in excess of that required to de-
velop a golden to bronze color in said mica.

6. The method of preparing coloring material
having a golden to bronze color which comprises
calcining mica containing not less than about
1.0% iron in its composition at a temperature of
substantially 750° C. in an oxidizing atmosphere
to develop said golden to bronze color.

7. The method of preparing coloring material
which comprises calcining mica containing iron
in an oxidizing atmosphere at temperatures of
substantially 750° C. for a substantial period of
time to develop a golden to bronze color.

8. As a new product, mica containing iron
which has been calcined, for a substantial period
of time, at a temperature sufficiently high but not
substantially in excess of that required to form
colored mica having a gold to bronze color.

9. The method of preparing coloring material
which comprises calcining mica containing iron,
for a substantial period of time, in an oxidizing
atmosphere at a temperature sufficiently high
but not substantially in excess of that required
to develop a golden to bronze color in the mica.

DAVIDSON C. WYSOR.